(12) United States Patent
Goren

(10) Patent No.: US 8,479,993 B2
(45) Date of Patent: Jul. 9, 2013

(54) METHOD FOR AIMING IMAGING SCANNER WITH SINGLE TRIGGER

(75) Inventor: David Goren, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/194,043

(22) Filed: Jul. 29, 2011

(65) Prior Publication Data

US 2013/0026236 A1    Jan. 31, 2013

(51) Int. Cl.
*G06K 7/10* (2006.01)
(52) U.S. Cl.
USPC ............. 235/462.2; 235/462.01; 235/462.11; 235/462.21
(58) Field of Classification Search
USPC .......... 235/435, 454, 462.01, 462.11, 462.18, 235/462.2, 462.21, 462.3
See application file for complete search history.

(56) References Cited

U.S. PATENT DOCUMENTS

| | | | |
|---|---|---|---|
| 5,545,889 A | | 8/1996 | Swartz et al. |
| 5,621,203 A | * | 4/1997 | Swartz et al. ............. 235/462.11 |
| 6,193,161 B1 | * | 2/2001 | Sojka et al. .............. 235/472.01 |
| 6,308,892 B1 | * | 10/2001 | Swartz et al. ............ 235/472.01 |
| 2003/0234291 A1 | | 12/2003 | Wulff et al. |
| 2006/0027657 A1 | * | 2/2006 | Ninnink et al. ................ 235/454 |
| 2006/0208086 A1 | * | 9/2006 | Rudeen et al. ........... 235/472.01 |
| 2007/0057067 A1 | * | 3/2007 | He ............................ 235/462.45 |
| 2008/0308638 A1 | * | 12/2008 | Hussey .................... 235/462.11 |

FOREIGN PATENT DOCUMENTS

| | | |
|---|---|---|
| EP | 0524029 A2 | 1/1993 |
| EP | 1205872 A1 | 5/2002 |

OTHER PUBLICATIONS

PCT International Search Report Dated Sep. 19, 2012 for PCT Application No. PCT/US2012/046571.

* cited by examiner

*Primary Examiner* — Daniel Hess
*Assistant Examiner* — Paultep Savusdiphol
(74) *Attorney, Agent, or Firm* — Non-Qiang Fan

(57) ABSTRACT

A method of operating a barcode reader. The method includes (1) detecting a first pulling of the trigger while the barcode reader is at the waiting mode; (2) detecting a first release of the trigger within a first predetermined time period after the first pulling of the trigger is detected, for operating the barcode reader in the aiming mode if the first release of the trigger is detected within the first predetermined time period,; and (3) detecting a second pulling of the trigger while the barcode reader is at the aiming mode within a second predetermined time period after the first release of the trigger is detected, for operating the barcode reader in the decoding mode if the second pulling of the trigger is detected within the second predetermined time period.

22 Claims, 5 Drawing Sheets

METHOD FOR AIMING IMAGING SCANNER WITH SINGLE TRIGGER

FIELD OF THE DISCLOSURE

The present disclosure relates generally to imaging-based barcode scanners.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more solid-state imagers for reading and decoding barcodes are typically referred to as imaging-based barcode readers, imaging scanners, or imaging readers. A solid-state imager generally includes a plurality of photosensitive elements or pixels aligned in one or more arrays. Examples of solid-state imagers include charged coupled devices (CCD) or complementary metal oxide semiconductor (CMOS) imaging chips.

Hand-held barcode scanners require a user to properly aim the scanner towards the desired barcode to be read. This is usually facilitated through the use of an aiming pattern that is projected onto the barcode. When there are a number of different barcodes in the field-of-view of the scanner, it can be difficult to scan the desired barcode. This issue is usually addressed by using a "Pick List" mode where only the barcode that has the aiming pattern present on the barcode is decoded. However, for aggressive barcode scanners, it is possible that an unintentional decode can occur while the user is in the process of placing the aiming pattern on the desired barcode. This occurs when the aiming spot passes over a non-desired barcode while the user is in the process of placing the aiming pattern on the desired barcode. This is particularly the case when using a long-range imager where aiming is more difficult and the potential of having many barcodes within the field-of-view is high.

One prior art solution as shown in FIG. 3 is to have a dual trigger system, where the first trigger puts the scanner into an aim mode, and the second trigger initiates the decoding. A disadvantage of this solution is the need to have two triggers which increases cost. Another prior art solution is to use a single trigger where the user pulls the trigger and the scanner remains in an aim mode for a fixed amount of time and then automatically enters a decode mode. This method has the disadvantage of assuming that the user has finished aiming the scanner before the time-out, which may not be the case. In addition, if the user has finished aiming, they must wait an additional time for the scanner to enter the decode mode. Making the aim mode timeout longer reduces the chance of a false read, but increases the decode time. Therefore, it is desirable to have better triggering mechanism for hand-held barcode scanners.

SUMMARY

In one aspect, the invention is directed to a method of operating a barcode reader. The method includes (1) detecting a first pulling of the trigger while the barcode reader is at the waiting mode; (2) detecting a first release of the trigger within a first predetermined time period after the first pulling of the trigger is detected, for setting the operating mode of the barcode reader such that if the first release of the trigger is detected within the first predetermined time period, operating the barcode reader in the aiming mode; and (3) detecting a second pulling of the trigger while the barcode reader is at the aiming mode within a second predetermined time period after the first release of the trigger is detected, for setting the operating mode of the barcode reader such that if the second pulling of the trigger is detected within the second predetermined time period, operating the barcode reader in the decoding mode.

Implementations of the invention can include one or more of the following advantages. The triggering methods for hand-held barcode scanners can be implemented more cost-effectively than some existing methods. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
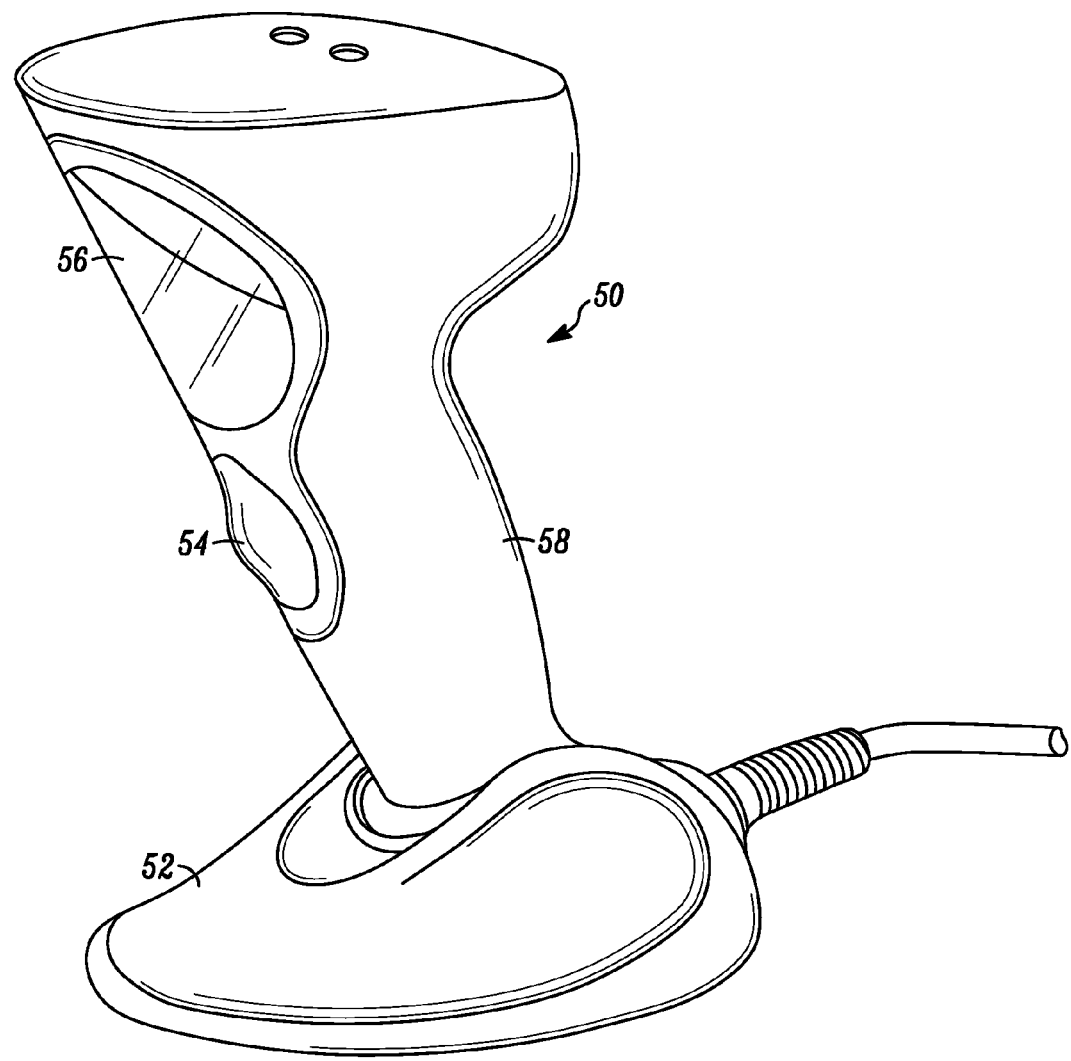
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
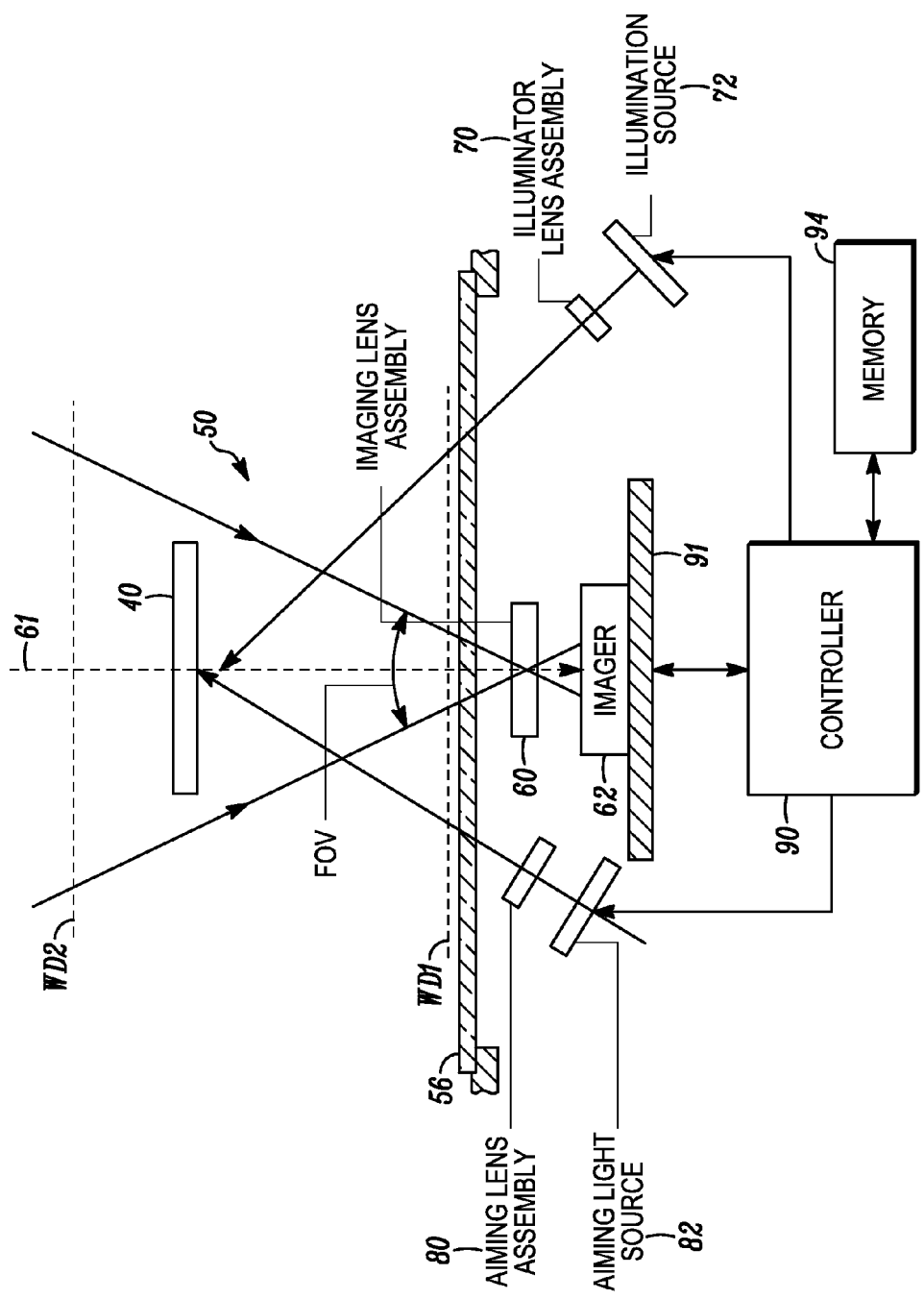
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) a solid-state imager 62 positioned behind an imaging lens assembly 60; (2) an illuminating lens assembly 70 positioned in front of an illumination source 72; (3) an aiming lens assembly 80 positioned in front of an aiming light source 82; and (4) a controller 90. In FIG. 2, the imaging lens assembly 60, the illuminating lens assembly 70, and the aiming lens assembly 80 are positioned behind the window 56. The solid-state imager 62 is mounted on a printed circuit board 91 in the imaging scanner.

The solid-state imager 62 can be a CCD or a CMOS imaging device. The solid-state imager 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The solid-state imager 62 is operative to detect light captured by an imaging lens assembly 60 along an optical axis 61 through the window 56. Generally, the solid-state imager 62 and the imaging lens assembly 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is about a few inches from the window 56, and WD2 is about a few feet from the window 56. Some of the imaging scanners can include a range finding system for measuring the distance between the barcode 40 and the imaging lens assembly 60. Some of the imaging scanners can include an auto-focus system to enable a barcode be more clearly imaged with the solid-state imager 62 based on the measured distance of this barcode. In some implementations of the auto-focus system, the focus length of the imaging lens assembly 60 is adjusted based on the measured distance of the barcode. In some other implementations of the auto-focus system, the distance between the imaging lens assembly 60 and the solid-state imager 62 is adjusted based on the measured distance of the barcode.

In FIG. 2, the illuminating lens assembly 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens assembly 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser or other kind of light sources.

In FIG. 2, the controller 90, such as a microprocessor, is operatively connected to the solid-state imager 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the solid-state imager 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Figure 3:
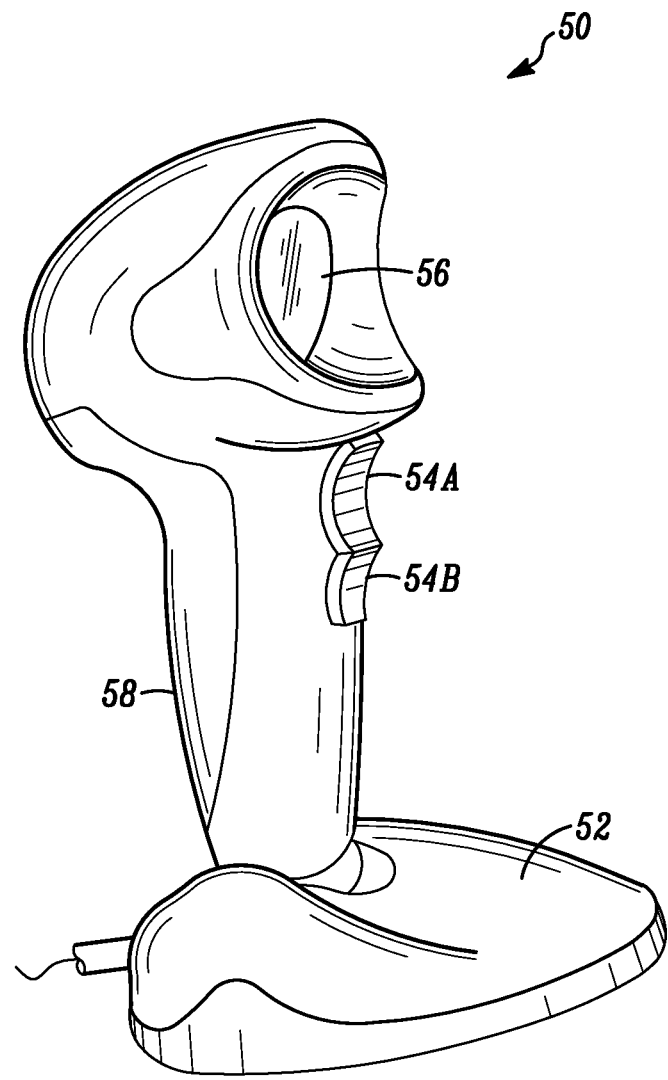
FIG. 3 shows a handheld imaging scanner that includes two triggers, as implemented in some prior art systems.

In a prior art system as shown in FIG. 3, the handheld imaging scanner 50 includes two triggers 54A and 54B. The first trigger 54A can be used to put the scanner into an aim mode in which a visible aiming light pattern is generated, and the second trigger 54B can be used to initiate the decoding. A disadvantage of this prior art system is that it requires two triggers, which increases the cost of the system. There is an additional method where the two triggers are based on the pressure of a single user trigger (e.g., user presses half way is aim, user presses whole way is decode). It maybe desirable to use one simpler trigger for both enabling the aim mode and initiating the decoding.

Figure 4:
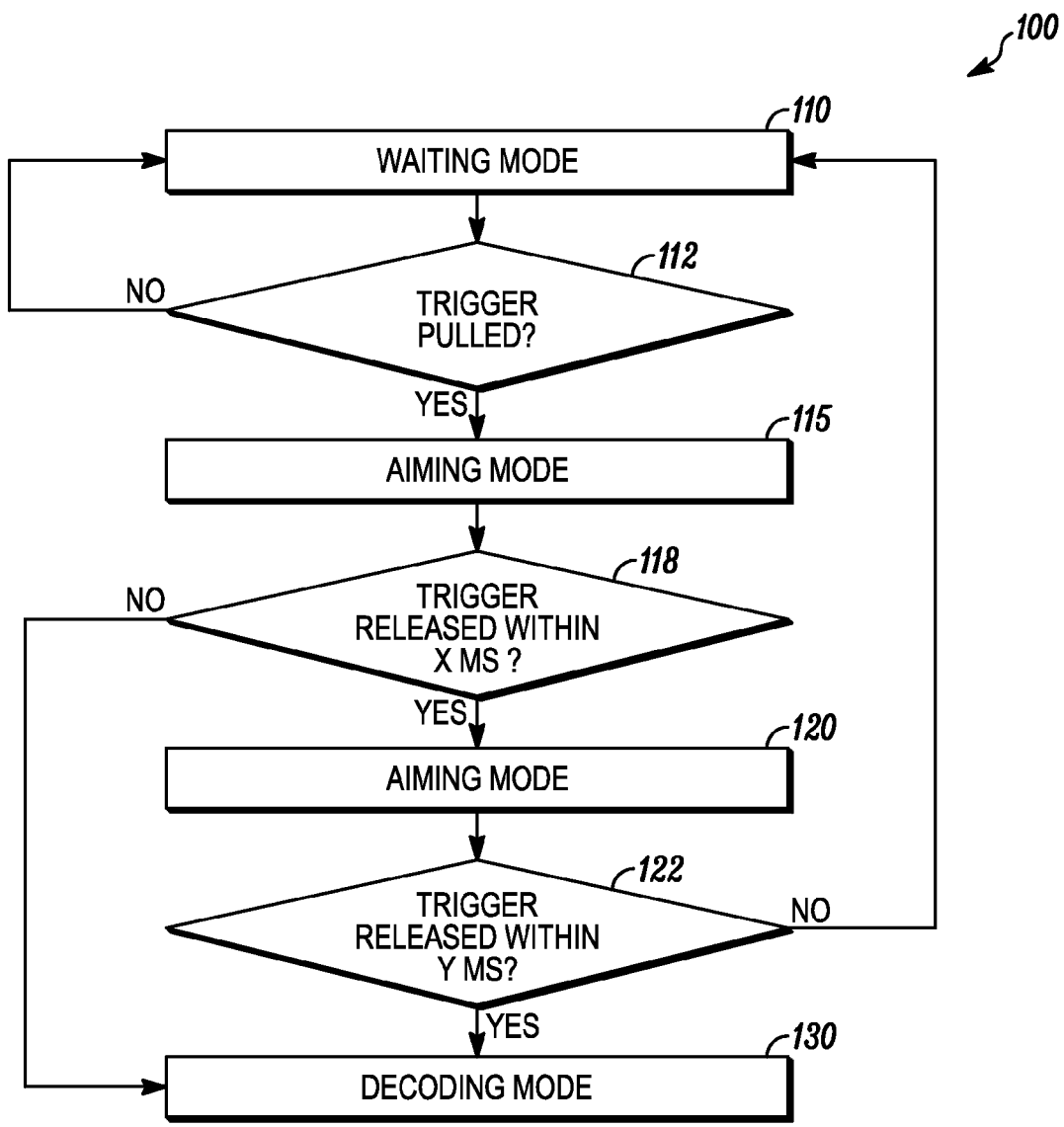
FIG. 4 is a flowchart of a method for operating a barcode reader in accordance with some embodiments.

FIG. 4 is a flowchart of a method 100 for operating a barcode reader in accordance with some embodiments. In one example, this barcode reader can be the handheld imaging scanner 50 as shown in FIGS. 1-2. The barcode reader has a trigger operative to set the barcode reader to an operating mode including at least one of (1) a waiting mode, (2) an aiming mode, and (3) a decoding mode. The barcode reader includes (1) a portable housing having a solid-state imager for capturing an image of a barcode and (2) an aiming light source for generating a visible aiming light pattern towards the barcode. The aiming light source is tuned on when the barcode reader operates in the aiming mode and is turned off when the barcode reader operates in the waiting mode.

In FIG. 4, the barcode reader initially operates in the waiting mode, and at block 110, the barcode reader waits for a trigger. At block 112, the barcode reader attempt to detect a first pulling of the trigger. If no pulling of the trigger is detected at block 112, the barcode reader remains at the waiting mode at block 110 and waits for a trigger. If the first pulling of the trigger is detected at block 112, the operating mode of the barcode reader changes to the aiming mode at block 115. In some implementations, the barcode reader changes to the aiming mode immediately after the first pulling of the trigger is detected. In some implementations, the barcode reader changes to the aiming mode with certain delays after the first pulling of the trigger is detected.

After entering the aiming mode at block 115, the barcode reader attempts to detect, at block 118 in FIG. 4, if the trigger is released within a first predetermined time period—X ms (i.e., X millisecond)—after the first pulling of the trigger. Quite often, to enter the aim mode, a user presses and immediately releases the trigger. That is, if the initial trigger is released with X millisecond (ms), the scanner will enter an aim mode at block 120 where the aim pattern is projected from the scanner and no decode can occur. If a user presses the trigger a second time while in the aim mode at block 120, the scanner immediately enters the decode mode at block 130. If the user does not press the trigger a second time within predetermined time period—Y ms (i.e., Y millisecond), the scanner exits the aim mode and enters the waiting mode at block 110.

There is also another way to enter the decode mode. Specifically, at block 118, if the trigger is not released within a first predetermined time period—X ms (i.e., X millisecond)—after the first pulling of the trigger, the scanner will enter the decoding mode at block 130. In some implementations, the captured image of the barcode is decoded when the scanner enters the decoding mode at block 130.

All times (including the first and second predetermined time periods and various delays) can be user programmable to be optimum for different scanner form factors and users. In some implementations, the first predetermined time period is chosen to be between 100 millisecond to 1000 millisecond (i.e. 100 ms$\leq$X$\leq$1000 ms), and the second predetermined time period is also chosen to be between 100 millisecond to 1000 millisecond (i.e. 100 ms$\leq$Y$\leq$1000 ms).

There are many of variations than can be applied to the basic single trigger aiming operation as shown in the flowchart of FIG. 4. For example, during the aim mode at block 115 or at block 120, the scanner illumination can be either on or off Leaving the illumination off while in aim mode will save power and increase the battery life. Leaving the illumination on during aim mode allows for faster decode time. With the illumination on during aiming mode, images can be collected in order to allow the automatic gain/exposure control loops to settle before decoding, thereby increasing decode time. For even faster decode time, decode attempts can be made on the collected images while in the aim mode at block 115 or at block 120. Once aim mode ends, the latest decode result during aim mode can be immediately chosen as the final decode when the scanner enters the decoding mode at block 130.

In another embodiment, a user can perform a fast "double click" trigger to bypass the aiming mode and have the scanner go directly to a decode mode. For example, in the flowchart as shown in FIG. 4, at block 112, after the pulling of the trigger is detected, the barcode reader does not enter the aiming mode at block 115; instead, the barcode reader attempts to detect whether the trigger is released and pulled again within a time period Z ms that is smaller than X ms, the first predetermined time period. If such fast "double click" is detected, the barcode reader directly enters the decoding mode at block 130. Conversely, if such fast "double click" is not detected, the barcode reader enters the aiming mode at block 115.

Figure 5:
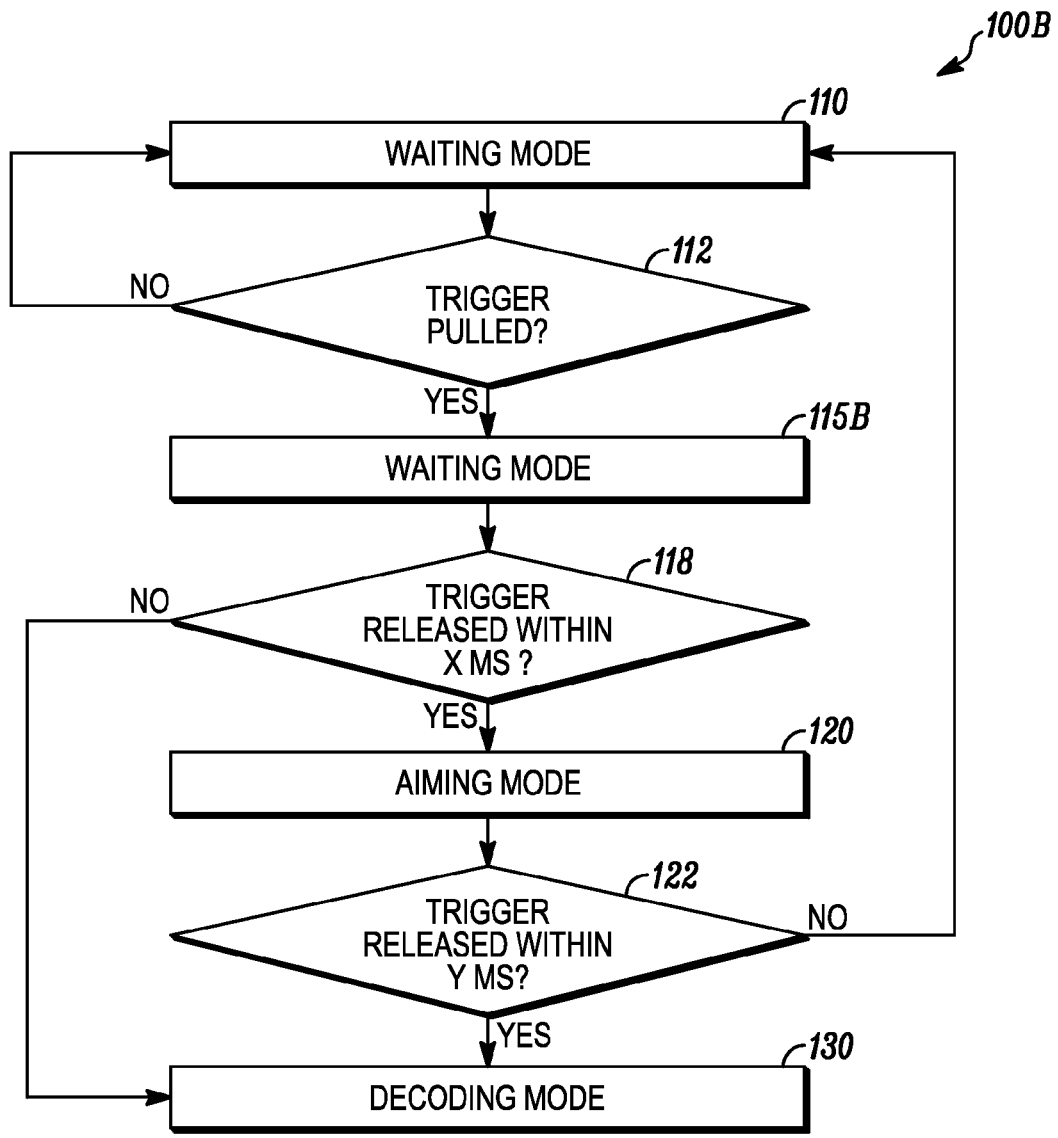
FIG. 5 is a flowchart of a method for operating a barcode reader in accordance with some other embodiments.

In still another embodiment, as shown in FIG. 5, the barcode reader does not enter the aiming mode after the trigger is pulled; instead, the barcode reader enters the aiming mode only after the trigger is released. In the flowchart as shown in FIG. 5, the waiting mode at block 115B substitutes the aiming mode at block 115 in FIG. 4. That is, after the pulling of the trigger is detected at block 112, the barcode reader enters the waiting mode at block 115B, and the barcode reader also attempts to detect, at block 118, if the trigger is released within X ms. After block 118, the barcode reader can enter either the aiming mode at block 120 or the decoding mode at block 130.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of operating a barcode reader, the barcode reader having a trigger operative to set the barcode reader to an operating mode including at least one of (1) a waiting mode, (2) an aiming mode, and (3) a decoding mode, wherein the barcode reader comprises (1) a portable housing having a solid-state imager therein that includes an array of photosensitive elements operative to capture an image of a barcode and (2) an aiming light source for generating a visible aiming light pattern towards the barcode, wherein the aiming light source is tuned on when the barcode reader operates in the aiming mode and is turned off when the barcode reader operates in the waiting mode, the method comprising:
  detecting a first pulling of the trigger while the barcode reader is at the waiting mode, wherein the first pulling of the trigger causes the trigger moving from an initial position towards a first position;
  detecting a first release of the trigger within a first predetermined time period after the first pulling of the trigger is detected, wherein the first release of the trigger causes the trigger moving from the first position towards the initial position, and said detecting a first release of the trigger includes setting the operating mode of the barcode reader such that,
    (a) if the first release of the trigger is detected within the first predetermined time period,
      operating the barcode reader in the aiming mode, and
    (b) if the first release of the trigger is not detected within the first predetermined time period,
      operating the barcode reader in the decoding mode; and
  detecting a second pulling of the trigger while the barcode reader is at the aiming mode within a second predetermined time period after the first release of the trigger is detected, for setting the operating mode of the barcode reader such that,
    (a) if the second pulling of the trigger is detected within the second predetermined time period,
      operating the barcode reader in the decoding mode, and
    (b) if the second pulling of the trigger is not detected within the second predetermined time period,
      operating the barcode reader in the waiting mode.

2. The method of claim 1, comprising:
  operating the barcode reader in the aiming mode after the first pulling of the trigger is detected but before the first release of the trigger is detected.

3. The method of claim 1, comprising:
  maintaining the barcode reader at the waiting mode after the first pulling of the trigger is detected but before the first release of the trigger is detected.

4. The method of claim 1, wherein the first predetermined time period is between 0.1 second to 1.0 second.

5. The method of claim 1, wherein the second predetermined time period is between 0.1 second to 1.0 second.

6. The method of claim 1, further comprising:
  adjusting the first predetermined time period.

7. The method of claim 1, further comprising:
  adjusting the second predetermined time period.

8. The method of claim 1, wherein the barcode reader comprises an illumination source for generating an illuminating light towards the barcode, the method further comprising:
  keeping the illumination source off during the aiming mode.

9. The method of claim 1, further comprising:
  generating an illuminating light towards the barcode during the aiming mode.

10. The method of claim 1, further comprising:
  capturing the image of the barcode with the solid-state imager while in the aiming mode.

11. The method of claim 1, further comprising:
  capturing the image of the barcode with the solid-state imager while in the aiming mode; and
  decoding the image of the barcode while in the aiming mode.

12. A barcode reader comprising:
  a trigger operative to set the barcode reader to an operating mode including at least one of (1) a waiting mode, (2) an aiming mode, and (3) a decoding mode;
  a portable housing having a solid-state imager therein that includes an array of photosensitive elements operative to capture an image of a barcode;
  an aiming light source for generating a visible aiming light pattern towards the barcode, wherein the aiming light source is tuned on when the barcode reader operates in the aiming mode and is turned off when the barcode reader operates in the waiting mode;
  a controller configured for
    (1) detecting a first pulling of the trigger while the barcode reader is at the waiting mode, wherein the first pulling of the trigger causes the trigger moving from an initial position towards a first position,
    (2) detecting a first release of the trigger within a first predetermined time period after the first pulling of the trigger is detected, wherein the first release of the trigger causes the trigger moving from the first position towards the initial position, and said detecting a first release of the trigger includes setting the operating mode of the barcode reader, and
    (3) detecting a second pulling of the trigger while the barcode reader is at the aiming mode within a second predetermined time period after the first release of the trigger is detected, for setting the operating mode of the barcode reader;
  wherein the detecting a first release comprises (a) if the first release of the trigger is detected within the first predetermined time period, operating the barcode reader in the aiming mode, and (b) if the first release of the trigger is not detected within the first predetermined time period, operating the barcode reader in the decoding mode; and wherein the detecting a second pulling comprises (a) if the second pulling of the trigger is detected within the second predetermined time period, operating the barcode reader in the decoding mode, and (b) if the second pulling of the trigger is not detected within the second predetermined time period, operating the barcode reader in the waiting mode.

13. The barcode reader of claim 12, wherein the controller is further configured for:

operating the barcode reader in the aiming mode after the first pulling of the trigger is detected but before the first release of the trigger is detected.

14. The barcode reader of claim 12, wherein the controller is further configured for:

maintaining the barcode reader at the waiting mode after the first pulling of the trigger is detected but before the first release of the trigger is detected.

15. The barcode reader of claim 12, wherein the first predetermined time period is between 0.1 second to 1.0 second.

16. The barcode reader of claim 12, wherein the second predetermined time period is between 0.1 second to 1.0 second.

17. The barcode reader of claim 12, wherein the first predetermined time period is adjustable by a user of the barcode reader.

18. The barcode reader of claim 12, wherein the second predetermined time period is adjustable by a user of the barcode reader.

19. The barcode reader of claim 12, further comprising:

an illumination source for generating an illuminating light towards the barcode; and wherein the controller is further configured for keeping the illumination source off during the aiming mode.

20. The barcode reader of claim 12, wherein the controller is further configured for generating an illuminating light towards the barcode during the aiming mode.

21. The barcode reader of claim 12, wherein the controller is further configured for capturing the image of the barcode with the solid-state imager while in the aiming mode.

22. The barcode reader of claim 12, wherein the controller is further configured for capturing the image of the barcode with the solid-state imager while in the aiming mode; and decoding the image of the barcode while in the aiming mode.

* * * * *